United States Patent [19]

Moskowitz

[11] Patent Number: 4,739,690

[45] Date of Patent: Apr. 26, 1988

[54] BALLISTIC ARMOR WITH SPALL SHIELD CONTAINING AN OUTER LAYER OF PLASTICIZED RESIN

[75] Inventor: Joel P. Moskowitz, Irvine, Calif.

[73] Assignee: Ceradyne, Inc., Costa Mesa, Calif.

[21] Appl. No.: 928,074

[22] Filed: Nov. 6, 1986

Related U.S. Application Data

[63] Continuation of Ser. No. 598,873, Apr. 10, 1984, abandoned.

[51] Int. Cl.$^4$ .............................................. F41H 5/12
[52] U.S. Cl. .................................. 89/36.02; 102/333; 428/409; 428/909
[58] Field of Search ................ 102/333; 428/408, 911; 89/36.02; 109/82, 80

[56] References Cited

U.S. PATENT DOCUMENTS

| | | | |
|---|---|---|---|
| 3,516,898 | 6/1970 | Cook | 89/36 A |
| 3,859,892 | 1/1975 | Coes | 428/911 X |
| 3,863,541 | 2/1975 | Cline et al. | 428/911 X |
| 3,864,204 | 2/1975 | Shorr et al. | 428/911 X |
| 3,871,026 | 3/1975 | Dorre | 428/911 X |
| 3,977,294 | 8/1976 | Jahn | 89/36.02 |
| 4,027,069 | 5/1977 | Mont et al. | 428/437 |
| 4,030,427 | 6/1977 | Goldstein | 428/911 X |
| 4,059,469 | 11/1977 | Mattimoe et al. | 156/108 |
| 4,101,709 | 7/1978 | Whang et al. | 428/454 X |
| 4,251,591 | 2/1981 | Chi | 428/437 X |
| 4,293,615 | 10/1981 | Bowen et al. | 428/437 X |
| 4,404,889 | 9/1983 | Miguel | 89/36 A |
| 4,469,743 | 9/1984 | Hiss | 428/437 X |
| 4,595,624 | 6/1986 | Greathead | 428/911 X |
| 4,613,535 | 9/1986 | Harpell et al. | 428/395 X |

*Primary Examiner*—Peter A. Nelson
*Attorney, Agent, or Firm*—Leonard Tachner

[57] ABSTRACT

A spall shield for armor plate for restraining at least a portion of flying fragments resulting from impact of a projectile with said armor plate, comprises a plasticized resin of the type commonly used as an interlayer of safety plate glass such as for example, plasticized polyvinyl acetal resin or plasticized polyvinyl butyral resin. The novel spall shield replaces nylon cloth, rubber, felt or resin impregnated glass fabric of the prior art while being at least as thin and light as the adhesive commonly used to adhere such prior art spall shield materials to the armor plate. The spall shield of the present invention is substantially lower in weight and substantially more efficient in performance than conventional spall shields.

15 Claims, 1 Drawing Sheet

BALLISTIC ARMOR WITH SPALL SHIELD CONTAINING AN OUTER LAYER OF PLASTICIZED RESIN

BACKGROUND OF THE INVENTION

1. FIELD OF THE INVENTION

The present invention relates generally to laminated ceramic armor materials and more specifically, to an improved ballistic armor laminate having a novel spall shield comprising a plasticized resin material such as that used as the plasticized interlayer in conventional laminated safety glass.

2. PRIOR ART

Conventional ceramic armor materials typically employ a laminated structure comprising a layer of ceramic material such as boron carbide and a layer of reinforced glass fabric such as Kevlar. The ceramic layer typically faces the expected incoming projectiles and is typically covered with what is called a spall shield, a thin, flexible, rubberized layer or sheet which is provided as the outer layer facing the incoming projectiles. This sheet may also be of ballistic nylon cloth or felt or resin impregnated glass fabric and is designed to prevent fragmentation of ceramic particles subsequent to the impact by the projectile. This sheet is typically adhered to the ceramic surface by some form of adhesive. One of the problems associated with using a nylon adhered spall shield is that it adds a considerable amount of weight to the ceramic armor. Another problem is the likelihood of a rip or tear which would allow fragments to be propelled by impact without restraint.

The concept of utilizing a laminated configuration of ceramic reinforced with a layer of glass fabric as a ballistic armor material is old in the art. By way of example, the patent to Cook (U.S. Pat. No. 3,516,898) relates to hard face plastic armor comprising a laminated structure having the combination of a facing layer made from an extremely hard material, a reinforced plastic substrata layer and flexible bonding means between the facing layer and the substrata layer wherein the facing layer is segmented into sections so that the concentrated energy of the projectile can be locally absorbed without fracture and loss of the surrounding facing. The use of a conventional spall shield comprising a thin, flexible, rubberized layer or sheet which may also be a ballistic nylon cloth and the like, is also disclosed in this patent. The patent to Triebel et al (U.S. Pat. No. 4,125,669) relates to a bullet-proof laminated safety glass which is formed of a silicate glass pane of at least 6 millimeters in thickness or an acrylic glass pane of at least 12 millimeters in thickness and a polycarbonate pane of at least 1½ millimeters in thickness.

None of the aforementioned patents discloses a combination of materials comprising a spall shield of a plasticized resin material such as that used as the plasticized interlayer of a laminated safety glass. Unfortunately, conventional spall shields such as those employing nylon adhered to the outer layer of ceramic material, add a considerable amount of weight to the ceramic armor. In addition, conventional spall shields present certain manufacturing complexities relating to carefully adhering the nylon material to the ceramic as a spall shield to catch fragments of the projectile as well as fragments of the ceramic that result from the impact of the projectile with the armor. Furthermore, nylon spall shields tend to be ripped or torn upon impact of a projectile and may reduce the ballistic properties of the armor combination.

SUMMARY OF THE INVENTION

The present invention comprises the novel substitution of a plasticized material such as the plasticized interlayer of laminated safety glass for the aforementioned ballistic nylon cloth sheet which is used as a spall shield. In the present invention the spall shield may comprise a plasticized polyvinyl acetal resin or a plasticized polyvinyl butyral resin which may be provided by way of example as a 5/1000 inch thick layer that may be merely painted onto the ceramic surface to serve the same function as the nylon spall shield of the prior art while significantly reducing the overall weight, complexity and manufacturing costs of the ceramic armor laminate. Furthermore, the novel spall shield of the present invention comprises an elastomeric adhesive quality which enhances fragment restraint capability and may enhance the ballistic performance ("stopping power") of the armor.

OBJECTS OF THE INVENTION

It is therefore a principal object of the present invention to provide an improved ballistic armor laminate material in which the conventional spall shield of the prior art is replaced by a plasticized resin material such as the plasticized interlayer of laminated safety glass and thereby reduce the weight, comlexity and manufacturing costs of the armor material, while potentially improving ballistic performance.

It is an additional object of the present invention to provide a novel ballistic armor laminated material utilizing a spall shiled in one illustrative embodiment comprising a plasticized polyvinyl acetal resin or plasticized polyvinyl butyral resin which may be painted directly onto the ceramic layer during manufacture thereby obviating the prior art requirement for utilizing an adhesive to secure the prior art spall shield to the ceramic material.

It is still a further object of the present invention to provide an improved ballistic armor laminate comprising a layer or reinforced glass fabric materials such as Kevlar adhered to a layer of ceramic material such as boron carbide and covered with an outer layer of plasticized resin such as the plasticized interlayer of laminated safety glass, the latter serving the same function as a conventional nylon spall shield while significantly reducing the overall weight, complexity and manufacturing costs of the assembled armor material.

BRIEF DESCRIPTION OF THE DRAWINGS

The aforementioned objects and advantages of the present invention as well as additional objects and advantages thereof will be more fully understood hereinafter as a result of a detailed description of a preferred embodiment of the invention when taken in conjunction with the drawings in which.

DETAILED DESCRIPTION OF A PREFERRED EMBODIMENT

Figure 1:
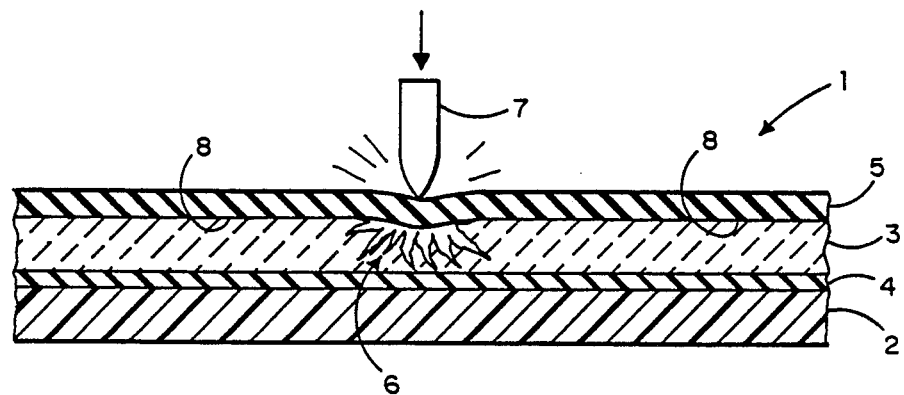
FIG. 1 is a fragmentary cross sectional view of a laminate structure of prior art ceramic armor showing a projectile just after striking the outer layer of the laminate.

Referring first to FIG. 1, there is shown a plastic laminate armor plate 1 comprising a backing or substrate layer 2, and an extremely hard surface layer 3 that is typically ceramic with the layers 2 and 3 being bonded together by a flexible bonding agent 4. Layer 2 is typically made of a reinforced fiber material such as Kevlar, but may be other suitable materials including certain metals such as aluminum. In order to prevent spalling or flaking of the outer layer 3 upon projectile impact, a thin, flexible, rubberized layer or sheet 5 is provided over the outer layer 3. Sheet 5 may also be of a ballistic nylon cloth or felt or resin impregnated glass fabric to further prevent fragmentation of ceramic layer 3 due to the impact of a projectile 7. It is to be noted with respect to FIG. 1 that the ceramic layer 3 tends to fracture in expanding conical shape indicated generally by the numeral 6 from the point of impact created by the projectile 7 as is well-known in the art. The continued impact of projectile 7 with the laminate 1 typically causes a complete fragmentation of the ceramic layer 3 as well as a delaminating effect of the several layers upon impact of the projectile. Typically, the projectile somewhat more shattered or flattened will have penetrated farther into the laminate and the conical plug 6 will have moved against the substrata 2 to deflect it downwardly over a relatively large area. This causes delamination of the reinforcing layers of Kevlar 2 as well as the adhesive 4 between the ceramic and Kevlar layers 3 and 2, respectively. Part of the impact process results in a fragmentation of the ceramic resulting in fragments which tend to fly in a direction opposite to that of the incoming projectile. The spall shield 5 functions to act as a barrier which catches the majority of such fragments as well as serving as a means for preventing further fragmentation of the ceramic layer 3 beyond the boundaries of the comb 6.

In a typical ceramic armor configuration the layer 2 of glass fiber material such as Kevlar may be typically 0.4 inches in thickness and the ceramic layer may be anywhere from 0.35 to 0.5 inches in thickness depending upon the degree of penetration force of the projectile for which the armor is designed to function. Typically, the spall shield is in the range of approximately 0.05 to 0.1 inches in thickness and is secured to the ceramic layer 3 by a thin layer of adhesive which may be on the order of 0.005 inches thickness.

Unfortunately, as previously noted, the spall shield 5 of the prior art has a number of significant disadvantages. One such principal disadvantage is the weight that such a layer of additional material, as well as the adhesive which is used to secure it to the ceramic layer 3, adds to the overall laminate structure. Total weight of the armor material is of particularly critical importance in applications involving military aircraft. Perhaps more importantly, the process of securing the nylon or rubberized spall shield to the ceramic material adds a time consuming and therefore costly additional step to the manufacturing process which requires skilled personnel to carefully align and secure the nylon spall shield to the ceramic layer 3.

Figure 2:
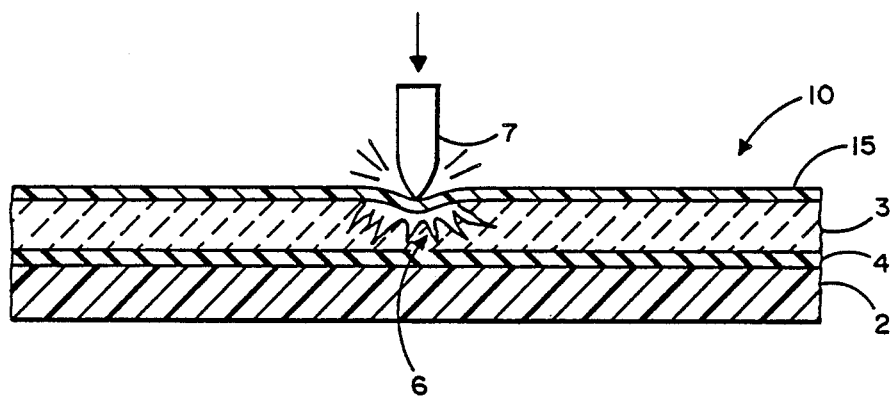
FIG. 2 is a fragmentary cross sectional view similar to FIG. 1 but illustrating the configuration of the present invention.

The present invention, as shown herein in FIG. 2, obviates the aforementioned disadvantageous nylon or rubberized spall shield 5 of the prior art laminate structure 1 in a unique and unobvious manner that has not heretofore been taught in the literature. More specifically, as seen in FIG. 2, the laminate structure 10 of the present invention substitutes a spall shield 15 which obviates the use of spall shield 5 and adhesive 8 depicted in FIG. 1. Spall shield 15 may be an adhesive that is similar to the adhesive used in safety plate glass such as the glass used conventionally in automobile windshields as the plasticized interlayer between two laminated layers of glass. Although the invention is not necessarily limited to the particular plasticized interlayers taught in the prior art, the interlayer materials disclosed in the prior art for use with safety glass structures are perfectly acceptable for use as a spall shield in the present invention. Typically, such plasticized interlayers comprise plasticized polyvinyl acetal resin or plasticized butyral resin such as disclosed in the patents to Mattimoe (U.S. Pat. No. 3,231,461), Lavin et al (U.S. Pat. No. 3,271,233) and Ohmae et al (U.S. Pat. No. 4,309,484). A layer of such plasticized resin material that may be only 0.005 inches or less in thickness or about equal to the thickness of the layer of adhesive 8 of the prior art laminate structure of FIG. 1, is applied on to the boron carbide surface to satisfactorily serve the same function as the nylon spall shield of the prior art while significantly reducing the overall weight, complexity and manufacturing costs of the overall armor structure. The resin material may be applied in a number of different processes such as spray painting, dipping or silkscreening.

Although the teachings of the aforementioned patents which relate to the manufacture of laminated safety glass may be used to aid in the manufacture of an appropriate spall shield in accordance with the present invention, it is to be understood that a number of the parameters of the plasticized interlayer that would be important to the safety plate glass industry are of little or no concern as used in the present invention. Such parameters include the following: refractive index, light transparency, and the effect of exposure to ultraviolet radiation. However, in all other aspects the teachings of the art relating to safety plate glass structure and manufacture may be advantageously utilized to provide an excellent spall shield for the present invention. Therefore, the teachings of the prior art such as those patents herein indicated that relate to the achievement of high tensile strength, tensile impact strength, bond strength and impact resistance as they relate to the use of the plasticized interlayer between two layers of glass in the safety glass art, would find advantageous use as it relates to the plasticized layer being used as a spall shield adhered to the ceramic layer 3 such as boron carbide and all the benefits derived from such teachings may be used advantageously in the present invention. The only exceptions are the structural differences residing in the use of the aforementioned plasticized resins as an outer layer adhered to a ceramic material as opposed to the use of the aforementioned plasticized resins as an interlayer between two layers of glass. Thus for example, those methods of the prior art which require the use of pressing the glass and plasticized resin as a laminate structure would likely not be appropriate for use in the present invention. However, those teachings of the prior art which relate to processing of the plasticized resin interlayer under reduced pressure such as the teachings in accordance with Japanese Patent Laid Open Application Nos. 242,10/1974 and 12411/1974, would find application in the present invention wherein a powdery hydration reaction product of ethylene copolymer is spread on a ceramic layer and the resulting combination subjected to heating under reduced pressure.

Alternatively, it is believed that the novel spall shield of the present invention may be applied to the ceramic layer by preparing a high temperature, highly viscous liquid resin compounded with a suitable plasticizer as taught by the prior art and further by means of painting the ceramic therewith and then subjecting the composite structure to a curing temperature of approximately 275 degrees F. or greater at ambient pressure for between 10 and 30 minutes or until a suitable bond has been generated between the layer of plasticized resin and ceramic.

The novel spall shield of the present invention need be no more than 0.005 to 0.03 inches in thickness, which is commensurate in thickness with the adhesive that is conventionally used to secure the nylon spall shield of the prior art to the ceramic layer. In effect therefore, the entire weight of the conventional nylon spall shield of the prior art is obviated by the present invention with little or no penalty in weight as compared to the conventional adhesive normally used to secure the prior art nylon spall shield to the ceramic layer thereby in effect reducing the weight of the laminate ceramic material by the entire weight of the prior art nylon spall shield while significantly reducing the complexity of manufacture and the cost associated therewith.

It will now be understood that what has been disclosed herein comprises an improved ceramic armor adapted for resisting the penetration of high speed projectiles such as bullets and the like and which uses a novel spall shield by replacing the ballistic nylon cloth or the like of the prior art and the adhesive associated therewith for securing the same to the ballistic ceramic layer used therein, with the material commonly used as a plasticized interlayer for laminated safety glass such as plasticized polyvinyl acetal resin or plasticized polyvinyl butyral resin or other such materials commonly used in the laminated safety glass art. As a result of the unique spall shield of the present invention the overall weight and thickness of the laminated structure is reduced while the complexity and cost of manufacture is also reduced.

Those having skill in the art to which the present invention pertains will, as a result of the teaching herein disclosed, now appreciate various modifications and additions that may be made in accordance with the invention. By way of example, although specific plasticized resin materials commonly used in safety glass plate structures have been disclosed as exemplary illustration of the materials which may be used as a spall shield in novel combinations herein, it will be understood that various other materials exhibiting similar characteristics that render them suitable for use as interlayers in safety plate glass structures may also be applied herein for the purposes disclosed. However, all such modifications and additions are contemplated as being within the scope of the present invention which is to be limited only by the claims appended hereto.

I claim:

1. An improved ballistic armor of the type having a laminated structure of a layer of ceramic material, a layer of reinforced fiber material and a spall shield, the latter being used to at least partially restrain fragments of the ceramic material and of a projectile impacting the armor; the improvement comprising:
    a spall shield formed of a plasticized resin adhered to the ceramic material as the outer layer of said armor.

2. The improvement recited in claim 1 wherein said plasticized resin is polyvinyl acetal resin.

3. The improvement recited in claim 1 wherein said plasticized resin is polyvinyl butyral resin.

4. The improvement recited in claim 1 wherein said ceramic material is boron carbide.

5. The improvement recited in claim 1 wherein said fiber material is fiberglass.

6. The improvement recited in claim 1 wherein said fiber material is Kevlar.

7. Armor plate comprising a spall shield formed of a layer of a adhesive resin adapted to at least partially restrain flying fragments generated by the impact of a projectile with said armor plate.

8. The armor plate recited in claim 7 wherein said adhesive resin is polyvinyl acetal resin.

9. The armor plate recited in claim 7 wherein said adhesive resin is polyvinyl butyral resin.

10. The armor plate recited in claim 7 wherein said resin is any resin useable as the interlayer in safety plate glass.

11. The armor plate recited in claim 7 further comprising a layer of ceramic material adhered to said spall shield and a layer of reinforced fiber material adhered to said ceramic material.

12. The armor plate recited in claim 11 wherein said ceramic material is boron carbide.

13. The armor plate recited in claim 11 wherein said reinforced fiber material is fiberglass.

14. The armor plate recited in claim 11 wherein said reinforced fiber material is Kevlar.

15. The armor plate recited in claim 7 further comprising a layer of ceramic material adhered to said spall shield and a layer of backing material adhered to said ceramic material.

* * * * *